United States Patent
Yoshida et al.

(10) Patent No.: US 12,451,993 B2
(45) Date of Patent: Oct. 21, 2025

(54) TRANSMISSION DEVICE, RECEPTION DEVICE, ENCODING METHOD, AND CONTROL CIRCUIT

(71) Applicant: Mitsubishi Electric Corporation, Tokyo (JP)

(72) Inventors: Hideo Yoshida, Tokyo (JP); Kenji Ishii, Tokyo (JP); Takafumi Fujimori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 29 days.

(21) Appl. No.: 18/608,211

(22) Filed: Mar. 18, 2024

(65) Prior Publication Data
US 2024/0223310 A1   Jul. 4, 2024

Related U.S. Application Data

(63) Continuation of application No. PCT/JP2021/042440, filed on Nov. 18, 2021.

(51) Int. Cl.
*H04L 1/00* (2006.01)
*H03M 13/27* (2006.01)

(52) U.S. Cl.
CPC .......... *H04L 1/0071* (2013.01); *H03M 13/27* (2013.01); *H04L 1/0041* (2013.01); *H04L 1/0045* (2013.01)

(58) Field of Classification Search
CPC .... H03M 13/19; H03M 13/27; H03M 13/152; H03M 13/255; H03M 13/29;
(Continued)

(56) References Cited

U.S. PATENT DOCUMENTS 6,944,729 B2   9/2005   Woodard
9,413,482 B2   8/2016   Gayrard et al.
(Continued)

FOREIGN PATENT DOCUMENTS

CN   101834672 B   6/2013
JP   2020-74550 A   5/2020
(Continued)

OTHER PUBLICATIONS

DVB-NGH specification DVB Blue Book A160 (Draft ETSI EN 303 105V1.1.1), "Digital Video Broadcasting (DVB); Next Generation broadcasting system to Handheld, physical layer specification (DVB-NGH)", Nov. 2012, total 295 pages.
(Continued)

*Primary Examiner* — Shelly A Chase
(74) *Attorney, Agent, or Firm* — Birch, Stewart, Kolasch & Birch, LLP

(57) ABSTRACT

A transmission device includes an outer code interleaver that generates multiple bit sequences while performing interleaving on a signal formed of multiple multilevel modulation symbols on a per-bit basis, an outer coding unit that performs outer coding processings, in parallel, on the multiple respective bit sequences generated by the interleaving, an outer code deinterleaver that performs deinterleaving on bit sequences obtained by performing the outer coding processings, the deinterleaving being inverse operation of the interleaving performed by the outer code interleaver, an inner coding unit that performs inner coding processings, in parallel, on bit sequences obtained by performing the deinterleaving in the outer code deinterleaver, and an inner code interleaver that performs time interleaving and symbol interleaving on bit sequences obtained by performing the inner coding processings.

11 Claims, 8 Drawing Sheets

(58) Field of Classification Search
CPC ............. H03M 13/2906; H04L 1/0045; H04L 1/0057; H04L 1/0065; H04L 1/0071
See application file for complete search history.

(56) References Cited

U.S. PATENT DOCUMENTS

| | | |
|---|---|---|
| 9,935,890 B2 | 4/2018 | Klenner |
| 10,382,168 B2 | 8/2019 | Miyata et al. |
| 10,454,841 B2 | 10/2019 | Klenner |
| 10,938,735 B2 | 3/2021 | Klenner |
| 11,451,487 B2 | 9/2022 | Klenner |
| 2013/0216221 A1 | 8/2013 | Zhang et al. |
| 2015/0039964 A1* | 2/2015 | Fonseka ............ H03M 13/2792 714/756 |
| 2018/0159791 A1 | 6/2018 | Klenner |
| 2019/0363736 A1* | 11/2019 | Shinohara ............ H03M 13/19 |
| 2023/0353266 A1* | 11/2023 | Yoshizawa ........... H04N 21/435 |

FOREIGN PATENT DOCUMENTS

| | | |
|---|---|---|
| WO | WO 2017/042864 A1 | 3/2017 |
| WO | WO 2020/183525 A1 | 9/2020 |

OTHER PUBLICATIONS

International Search Report for PCT/JP2021/042440 (PCT/ISA/210) mailed on Feb. 1, 2022.
Extended European Search Report issued in European Application No. 21964751.8 on Nov. 4, 2024.

\* cited by examiner

TRANSMISSION DEVICE, RECEPTION DEVICE, ENCODING METHOD, AND CONTROL CIRCUIT

CROSS-REFERENCE TO RELATED APPLICATION

This application is a continuation application of International Application PCT/JP2021/042440, filed on Nov. 18, 2021, and designating the U.S., the entire contents of which are incorporated herein by reference.

BACKGROUND OF THE INVENTION

1. Field of the Invention

The present disclosure relates to a transmission device that performs error correction coding on a transmission sequence, and to a reception device, an encoding method, a control circuit, and a storage medium.

2. Description of the Related Art

A high-speed transmission apparatus for use in an optical transmission system or the like generally uses an error correction code as an effective method for providing high transmission capacity and long-distance transmission. Error correction coding is a technology used in a wired communication system, a wireless communication system, a storage device, and the like. Error correction coding is a technology that can provide error correction even when an error occurs in data received by a reception device, by adding a redundant bit to digital data transmitted by a transmission device. Various techniques have been proposed as techniques of error correction coding and error correction decoding, including block codes such as Hamming code, Bose-Chaudhuri-Hocquenghem (BCH) code, Reed-Solomon (RS) code, and low density parity check (LDPC) code, product codes and concatenated codes using a combination thereof, and the like.

Use of an error correction code enables an error occurred in a transmission channel to be detected and corrected. There is a limit, however, on the number of error bits whose error can be corrected. In addition, the number of error bits whose error can be corrected depends on error correction performance of the error correction code technique used and on the decoding technique used. In the context of error correction code, transmission data including the overhead in a frame is called information bits. In addition, redundancy bits added to the information bits is called parity bits. The parity bits are calculated from the information bits using a different calculation method for a different error correction coding technique used. A bit sequence formed of information bits and parity bits is called codeword.

A technique using a type of error correction code called block code calculates the parity bits from the information bits every predefined number of bits. That is, the number of information bits and the number of parity bits in a single codeword are predetermined, and are respectively called information bit length and parity bit length. An error correction code having a bit configuration of a code configuration including the information bits and the parity bits separately is called systematic code. In addition, the number of bits of a codeword is called code length.

Optical transmission systems in core-metro networks for use in a submarine cable and in interurban communication are in significant demand for increase in transmission capacity and increase in transmission distance. This has led to use and suggestion of high-performance error correction codes for high-speed transmission in a speed range from several hundred gigabit per second (Gbps) to one terabit per second (Tbps) or the like. In recent years, technology of digital coherent optical transmission has been increasingly used for high-speed transmission in optical transmission systems in core-metro networks. In such digital coherent optical transmission, multiple bits are mapped to a single modulation symbol using a multilevel modulation scheme such as 256 quadrature amplitude modulation (QAM). Technology of multi-subcarrier transmission has also been increasingly used for providing high-speed high-capacity transmission using multiple carrier waves.

Multilevel modulation schemes such as 256 QAM are subjected to a different error rate from bit to bit within a symbol. Thus, technologies such as coded modulation techniques and multilevel coding techniques have been suggested that perform error correction coding on each bit sequence mapped to a symbol, depending on the characteristic thereof. WO 2017/042864 A discloses a technology of performing computation of coding processing or decoding processing on an input of multiple bits to provide high-speed processing in coding and decoding for error correction, particularly for block codes such as BCH code, RS code, and LDPC code. A method has also been suggested in recent years for reducing a symbol error rate by performing bit manipulation, using a technique such as probabilistic signal shaping (PS), on a bit sequence including bits having a high error rate in a multilevel modulation symbol. Probabilistic signal shaping manipulation is performed, prior to the error correction coding, to map the parity bits generated by error correction coding to a multilevel modulation symbol having a low bit error rate.

In multilevel modulation transmission, conditions such as noise and/or distortion in the transmission channel may cause a burst error, which includes concentrated errors. A measure in error correction against this is taken using a method of interposing interleave operation to spread the burst error across multiple error correction code sequences to thereby efficiently use the correction ability with respect to error correction code sequences.

An optical transmission system is demanded in recent years to have higher throughput with the increase in transmission capacity. As such, performing error correction coding processing in a single circuit has become difficult to support 1 Tbps-class transmission capacity. To address this problem, a method has been used in which multiple circuits are disposed in parallel to each other to simultaneously process multiple error correction code sequences. An interleave scheme to support this method has thus been used.

The technology described in WO 2017/042864 A relates to block interleaving performed on the transmission side, in which multiple series of input data are stored in a memory for performing interleaving, resulting data is distributed over multiple error correction coding circuits disposed in parallel to each other, where coding is performed, and the coded data is stored in a memory for performing deinterleaving, which is inverse operation of interleaving. A device on the reception side corrects errors using an interleave and deinterleave units each including a memory similar to the memory on the transmission side and using multiple error correction decoding circuits disposed in parallel to each other, and then outputs corrected data. In this configuration, in comparison between the frame format before undergoing error correction coding and the modulation mapping after undergoing error correction coding, the bit value in a dummy bit in the frame format before undergoing error correction coding is replaced with the parity of the error correction code. Nevertheless, these data can be passed to the modulation mapping part using a same frame format. A large-capacity memory is, however, required for interleaving and deinterleaving in each of the transmission and reception sides, thereby presenting a problem of increase in process delay time caused by storing data in memories.

SUMMARY OF THE INVENTION

To solve the above problem and achieve the object, a transmission device according to the present disclosure comprises: an outer code interleaver to generate a plurality of bit sequences while performing interleaving on a signal on a per-bit basis, the signal being formed of a plurality of multilevel modulation symbols; an outer coding unit to perform outer coding processings, in parallel, on the plurality of respective ones of the bit sequences generated by the interleaving; and an outer code deinterleaver to perform deinterleaving on bit sequences obtained by the outer coding processings, the deinterleaving being inverse operation of the interleaving performed by the outer code interleaver. The transmission device further comprises an inner coding unit to perform inner coding processings, in parallel, on bit sequences obtained by the deinterleaving in the outer code deinterleaver; and an inner code interleaver to perform time interleaving and symbol interleaving on bit sequences obtained by the inner coding processings.

DETAILED DESCRIPTION OF THE PREFERRED EMBODIMENTS

A transmission device, a reception device, an encoding method, a control circuit, and a storage medium according to embodiments of the present disclosure will be described in detail below with reference to the drawings.

First Embodiment

Figure 1:
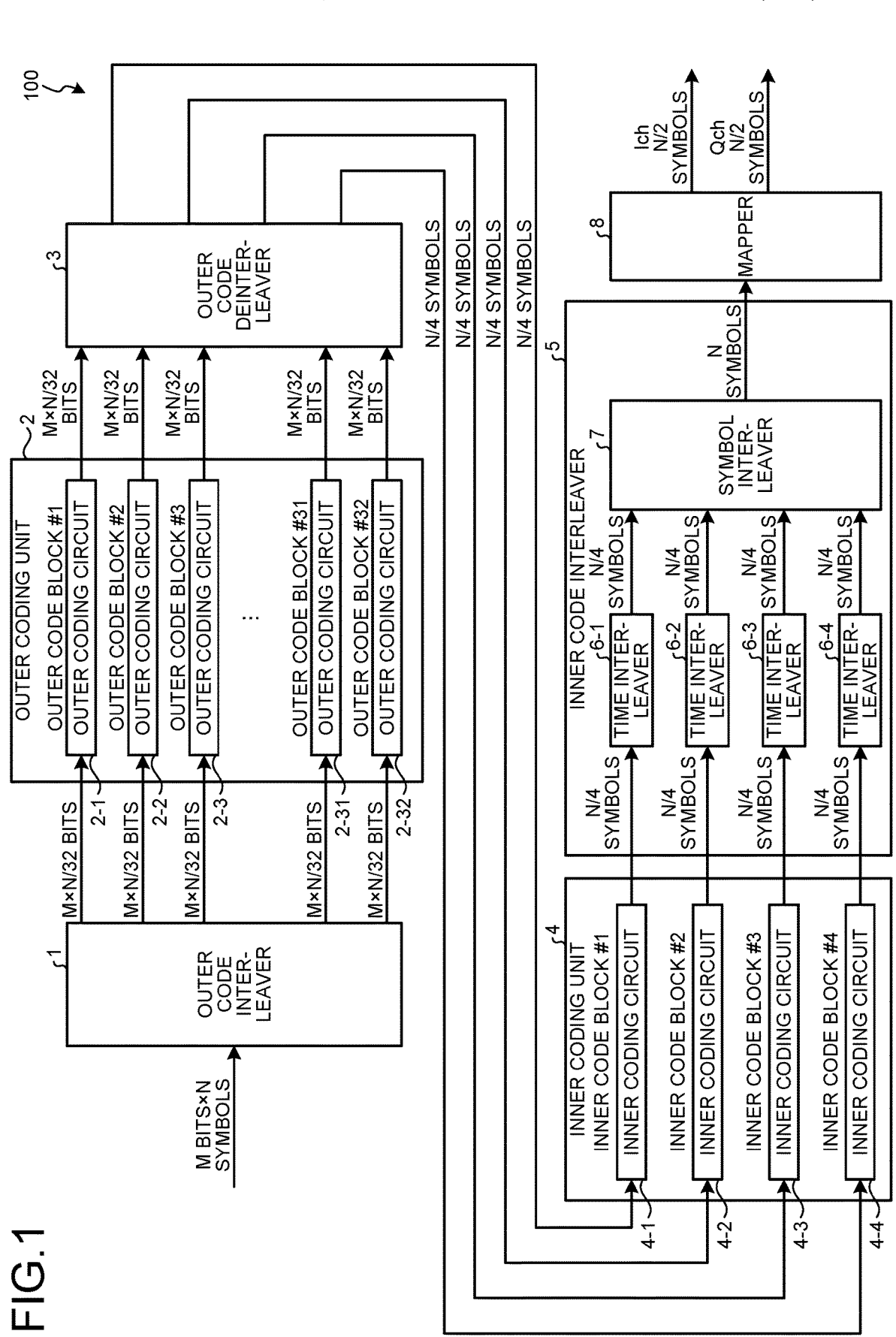
FIG. 1 is a diagram illustrating an example configuration of a transmission device according to a first embodiment.

FIG. 1 is a diagram illustrating an example configuration of a transmission device according to a first embodiment, more specifically, an example configuration of a transmission device 100, which uses concatenated error correction code for transmission of a multilevel modulation symbol. The transmission device 100 according to the present embodiment uses a bit error correction code such as BCH code as the outer code of the concatenated error correction code, and uses a systematic code including information bits and parity bits separately, as the inner code, where the systematic code is a high-performance code such as LDPC code for performing soft decision decoding. FIG. 1 illustrates an example configuration in which N symbols each having M bits obtained using PS operation are input in parallel. In this example, a symbol has an N-bit format of each of I-channel (hereinafter denoted by I-ch) data or Q-channel (hereinafter denoted by Q-ch) data that constitutes a multilevel modulation symbol. In this case, the number of the N symbols is an even number. Note that I-ch data and Q-ch data may together form a symbol having an M-bit format.

The transmission device 100 includes an outer code interleaver 1, an outer coding unit 2 including outer coding circuits 2-1 to 2-32, an outer code deinterleaver 3, an inner coding unit 4 including inner coding circuits 4-1 to 4-4, an inner code interleaver 5 including time interleavers 6-1 to 6-4 and a symbol interleaver 7, and a mapper 8.

In the transmission device 100, the foregoing N-symbol parallel data is input to the outer code interleaver 1, which distributes the data over the multiple outer coding circuits 2-1 to 2-32 included in the outer coding unit 2. Note that it is assumed that a fixed value (e.g., 0) has been set in a bit field for setting each set of the parity bits (which may be referred to hereinafter as parity setting position) generated by outer coding and inner coding, in the bit sequence included in the N-symbol parallel data at the time of input to the outer code interleaver 1.

The outer code interleaver 1 performs interleaving on a signal formed of multilevel modulation symbols on a per-bit basis. Specifically, the outer code interleaver 1 outputs each bit of the N-symbol data input thereto to one of the outer coding circuits 2-1 to 2-32 downstream thereof to map the bits in a same symbol to different outer code sequences to generate multiple bit sequences. Note that a code sequence may be referred to hereinafter as code block.

Figure 2:
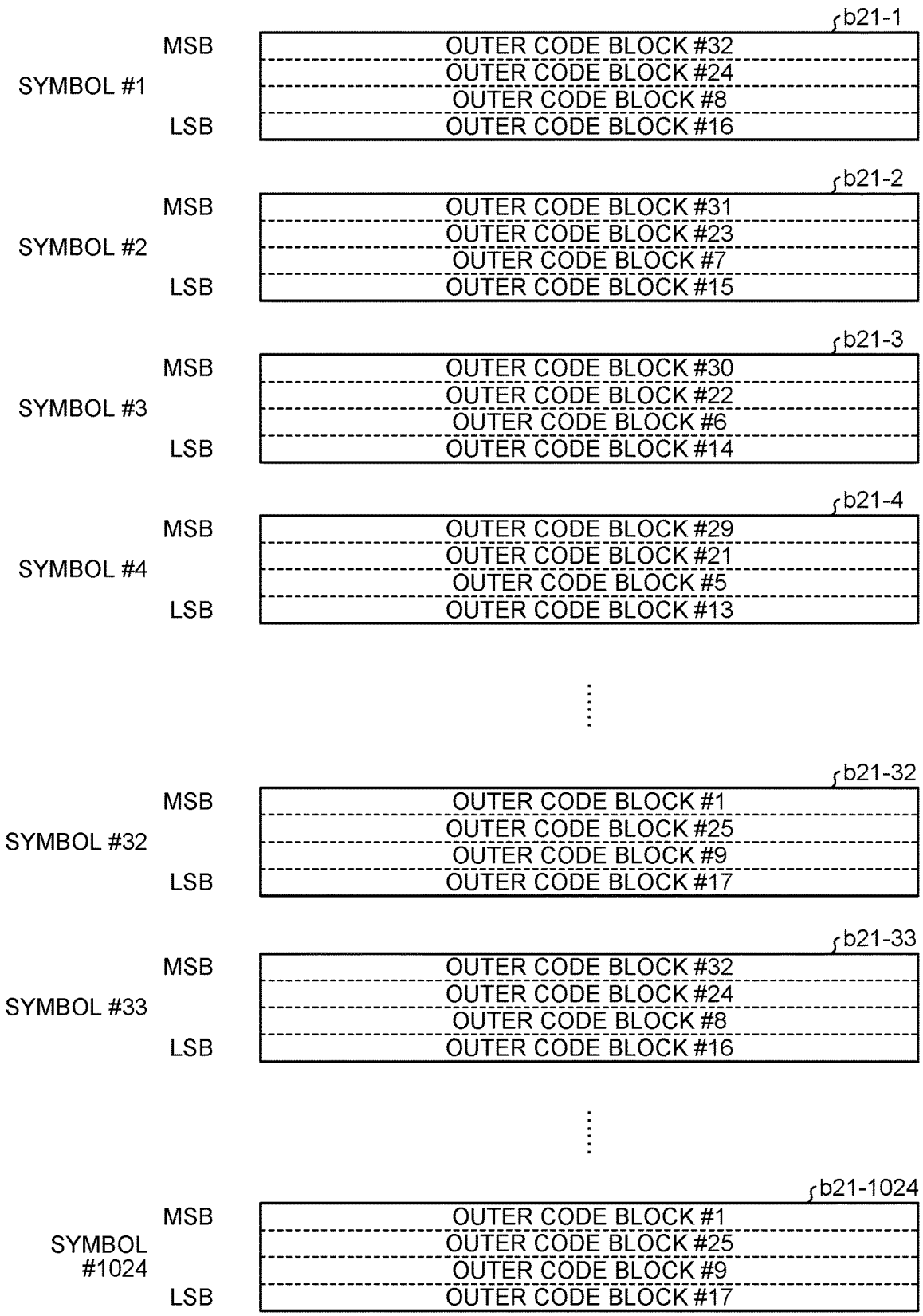
FIG. 2 is a diagram illustrating an example of interleaving performed by an outer code interleaver of the transmission device according to the first embodiment.

An example of interleaving performed on input data by the outer code interleaver 1 will next be described with reference to FIG. 2. FIG. 2 is a diagram illustrating an example of interleaving performed by the outer code interleaver 1 of the transmission device 100 according to the first embodiment.

FIG. 2 illustrates an example of a case of M=4 and N=1024, in which 4-bit symbols #1 to #1024 are input to the outer code interleaver 1, and in which the number of the parallel outer code blocks (hereinafter referred to as the parallel number of the outer code blocks) is 32, and the outer code interleaver 1 maps the bits of the input data to outer code blocks #1 to #32 to reorder these bits.

As illustrated in FIG. 2, the outer code interleaver 1 assigns the four bits of each symbol of the symbols #1 to #1024 to the outer code blocks at an 8-codeword interval. Specifically, the outer code interleaver 1 assigns a 4-bit group b21-1 of the symbol #1 to the outer code block #32, the outer code block #24, the outer code block #8, and the outer code block #16 in order from the most significant bit (MSB). In addition, the outer code interleaver 1 assigns a 4-bit group b21-2 of the symbol #2 to the outer code blocks shifted by one relative to the respective outer code blocks to which the bits of the 4-bit group b21-1 of the symbol #1 have been mapped. Thereafter, similarly, the outer code interleaver 1 assigns a 4-bit group b21-3 of the symbol #3, a 4-bit group b21-4 of the symbol #4, . . . to applicable outer code blocks while shifting each of the applicable outer code blocks by one. One cycle of assignment to the 32 outer code blocks is completed at a 4-bit group b21-32 of the symbol #32. The outer code interleaver 1 then assigns a 4-bit group b21-33 of the symbol #33 to the same set of outer code blocks as those involved in assignment of the 4-bit group b21-1 of the symbol #1. Thereafter, the outer code interleaver 1 performs assignment to the outer code blocks #1 to #32 on a 32-symbol cycle similarly, and thus assigns a 4-bit group b21-1024 of the symbol #1024 to the same set of outer code blocks as those involved in assignment of the 4-bit group b21-32 of the symbol #32. The information bits to be outer coded in a 32 parallel configuration are all organized into the outer code blocks with an A×L-clock input, thereby facilitating frame synchronization and allowing the interleaving to be performed simply by bit reordering without need for a memory. That is, the foregoing eliminates a process in which the data to be processed in interleaving is once stored in a memory and is then read for reordering the bits, thereby enabling a reduction in the number of memories and also a reduction in process delay.

The outer coding unit 2, which is a circuit for performing error correction coding on the multiple parallelized outer code sequences of this example, is configured to have a parallel arrangement of the outer coding circuits 2-1 to 2-32, which perform encoding under a same encoding rule. The parallel number of the outer coding circuits is desirably a divisor of the number N of the symbols input in parallel to the outer code interleaver 1. The parallel number of the outer coding circuits is also desirably a multiple of the number M of the bits constituting a symbol. Use of such parallel number enables the M bits having unevenly spread bit error rates occurring in multilevel modulation symbols, to have evenly spread error rates across the outer code sequences. For this reason, the transmission device 100 according to the present embodiment illustrated in FIG. 1 is configured in which the outer coding unit 2 includes the outer coding circuits 2-1 to 2-32 to have a parallel number of 32.

Otherwise, when the parallel number of the outer coding circuits included in the outer coding unit 2 does not satisfy the above conditions, the encoding rule of error correction code may be modified in part of the outer coding circuits to cause the outer code interleaver 1 to distribute the M×N bits accordingly. The input number of N symbols to be processed in the outer code sequences is, nevertheless, desirably the same.

The outer coding circuits 2-1 to 2-32 perform, for example, BCH coding processing, and each replace the fixed value that has been set in the outer code parity setting position of the input data with the parity bit or parity bits (referred to hereinafter in the singular) of the outer code generated. In this operation of coding processing, considering that parallel bits are input from the outer code interleaver 1, the outer coding processing of the parallel bits that have been input can be easily performed by performing the coding processing also on the fixed value (e.g., 0) set in the outer code parity setting position as an information bit, and by afterward setting the generated parity bit by replacement. Note that the parity bit of the outer code may replace the fixed value in the parity setting position of an information bit sequence that will be input as the next outer code data, rather than the fixed value in the parity setting position of the information bit sequence that has been input, to thereby spread the parity bits across multilevel modulation symbols.

The outer-coded sequences each including the parity bit of the outer code that has been set by a corresponding one of the outer coding circuits 2-1 to 2-32 are input to the outer code deinterleaver 3. The outer code deinterleaver 3 performs deinterleaving on the outer-coded sequence that has been input. Deinterleaving is inverse operation of the interleaving performed by the outer code interleaver 1. That is, the outer code deinterleaver 3 reorders the bits of the outer-coded sequence whose bits have been reordered through the interleaving performed by the outer code interleaver 1 to thus restore the format of N symbols in accordance with the symbol sequences resulting from PS operation. The outer code deinterleaver 3 divides evenly the N symbols having the restored format into as many symbol sequences as the number of the multiple inner coding circuits 4-1 to 4-4 disposed downstream thereof, and inputs these symbol sequences to the respective inner coding circuits 4-1 to 4-4 each as an inner code block. In the present embodiment, the outer code deinterleaver 3 divides the N symbols having the restored format into four tuples.

The multiple inner coding circuits 4-1 to 4-4 perform, as inner coding processing, LDPC coding or the like on an entirety or part of each symbol having the M-bit format, for example, on bits more likely to have an error in a multilevel modulation symbol. The multiple inner coding circuits 4-1 to 4-4 each replace the fixed value that has been set in the inner code parity setting position of each input bit sequence, with the parity bit of the inner code generated in the inner coding processing. Note that the bits that have undergone no inner coding are output with a bit state maintained from the time of input.

Similarly to the parallel number of the outer coding circuits, the parallel number of the inner coding circuits is desirably a divisor of the number N of the parallel-input symbols. In addition, use of a divisor or a multiple of the parallel number of the outer coding circuits will provide equal correction capability. Thus, the transmission device 100 according to the present embodiment illustrated in FIG. 1 is configured in which the inner coding unit 4 includes the inner coding circuits 4-1 to 4-4 to have a parallel number of 4 in the context of the number N of the parallel-input symbols of 1024, and in the context of the parallel number of the outer coding circuits of 32. Obviously, similarly to the case of outer code, this configuration can be adjusted by modification of part of the encoding rule. In addition, use of a uniform size of L clocks for the parallelized inner code blocks facilitates synchronization among inner code frames, and synchronization of the inner code blocks with the outer code blocks in units of A×L clocks enables the inner code blocks to be synchronized at synchronization timing of the outer codes.

The bit sequences each including the parity bit of the inner code that has been set by a corresponding one of the inner coding circuits 4-1 to 4-4 are input to the inner code interleaver 5. The inner code interleaver 5 includes the time interleavers 6-1 to 6-4, as many as the parallel number of the inner coding circuits 4-1 to 4-4 included in the inner coding unit 4 upstream thereof, and the symbol interleaver 7. In the example illustrated in FIG. 1, the inner code interleaver 5 includes the four time interleavers 6-1 to 6-4. Note that, in the inner code interleaver 5, the time interleavers 6-1 to 6-4 and the symbol interleaver 7 perform time interleaving and symbol interleaving described later, which generate a same result whichever type of interleaving is performed first. In the present embodiment, time interleaving is performed first by way of example. As such, the time interleavers 6-1 to 6-4 are disposed upstream. The bit sequences output from the inner coding circuits 4-1 to 4-4 are input to the time interleavers 6-1 to 6-4.

Figure 3:
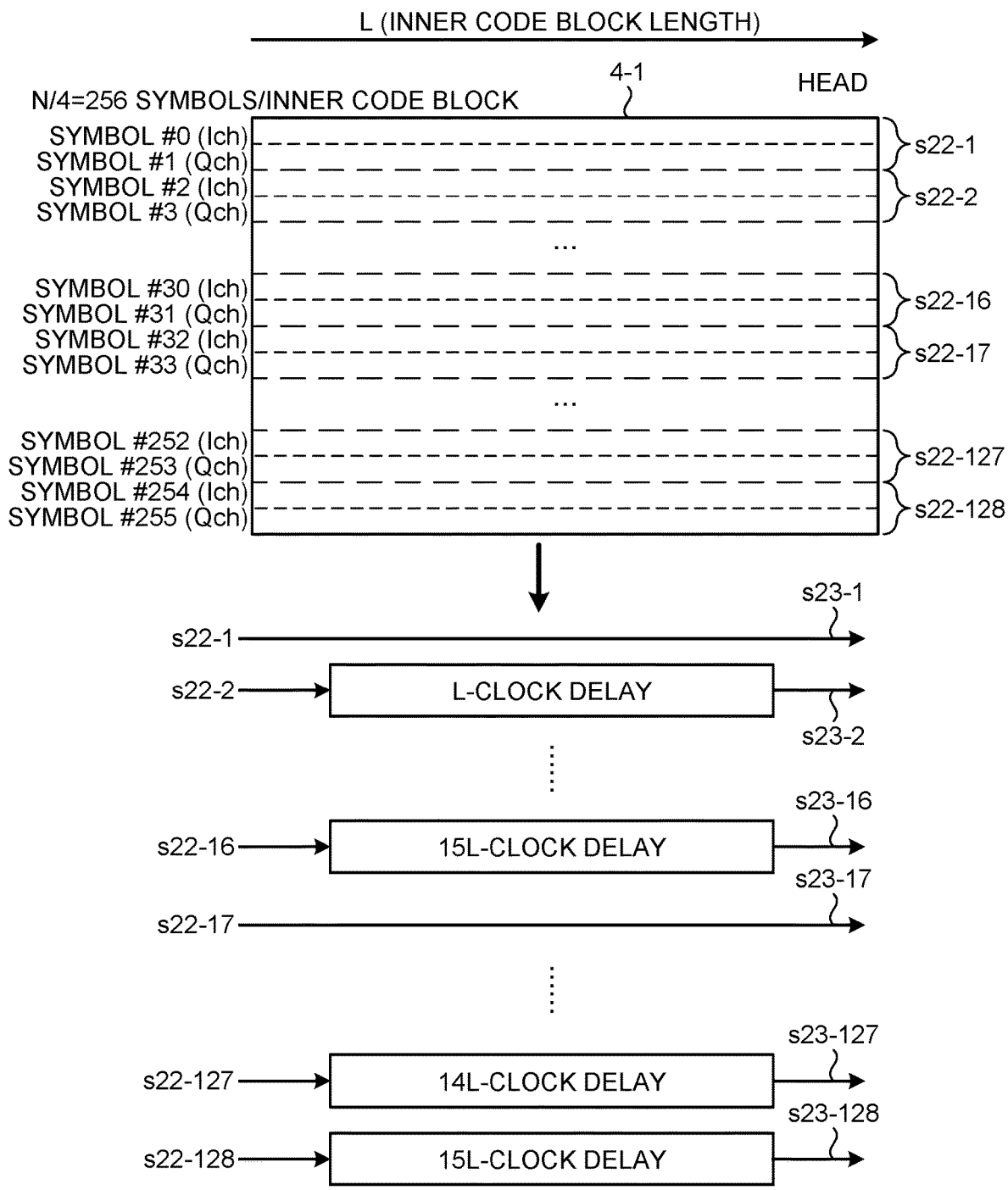
FIG. 3 is a diagram illustrating an example of time interleaving performed by time interleavers of the transmission device according to the first embodiment.

The time interleavers 6-1 to 6-4 perform the time interleaving illustrated in FIG. 3 on the input bit sequences. FIG. 3 is a diagram illustrating an example of the time interleaving performed by the time interleavers 6-1 to 6-4 of the transmission device 100 according to the first embodiment.

For example, when the number N of the symbols included in the input data of parallelized N symbols is 1024, and the parallel number of the inner coding circuits included in the inner coding unit 4 is four, one inner coding circuit inputs and outputs N/4=256 symbols. In this respect, let a symbol pair refer to a pair of a single I-ch symbol and a single Q-ch symbol constituting a modulation unit. Then, one inner coding circuit outputs 128 symbol pairs. For example, the time interleaver 6-1 introduces a delay to 128 symbol pairs s22-1, s22-2, . . . , s22-16, s22-17, . . . , s22-127, and s22-128 that have been output by the inner coding circuit 4-1 upstream thereof as illustrated in FIG. 3, using a delay element that delays symbol pairs adjacent to each other by different amounts of delay, to thereby generate output signals s23-1, s23-2, . . . , s23-16, s23-17, . . . , s23-127, and s23-128. In this operation, the time interleaver 6-1 delays each symbol pair by an amount of delay that is an integer multiple of the interval L of the inner code block to make symbol pairs adjacent to each other be symbol pairs belonging to different inner code blocks. Note, however, that a high value of integer multiple affects the delay and the memory capacity, and therefore the number of different amounts of delay introduced to the 128 symbol pairs by the time interleaver 6-1 is desirably a divisor of the number of symbol pairs included in each inner code block. The example illustrated in FIG. 3 uses 16 amounts of delay, i.e., from 0L-clock delay (amount of delay is zero; the amount of delay introduced to symbol pairs s22-1, s22-17, s22-33, . . . , and s22-122) to 15L-clock delay (the amount of delay introduced to symbol pairs s22-16, s22-32, . . . , and s22-128).

Figure 4:
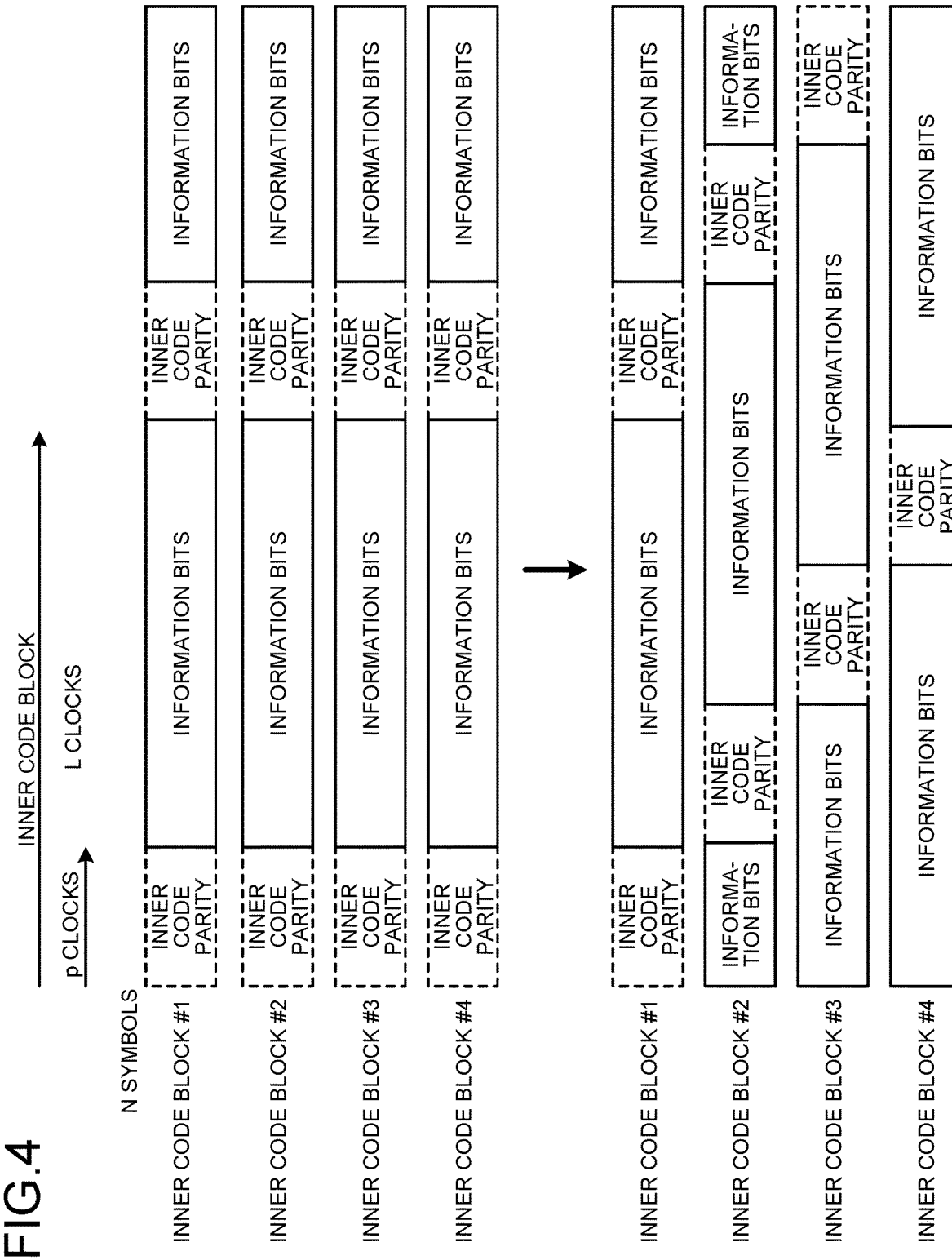
FIG. 4 is a diagram for describing an example operation of the time interleavers of the transmission device according to the first embodiment.

Note that when the multiple inner code blocks are arranged in parallel to each other, and performance of inner code correction includes non-uniformity, the amount of delay to be introduced to each symbol pair may be varied among inner code blocks to avoid non-uniformity in burst error correction. One example is as follows. FIG. 4 is a diagram for describing an example operation of the time interleavers 6-1 to 6-4 of the transmission device 100 according to the first embodiment. In the example illustrated in FIG. 4, the four parallelized L-clock inner code blocks #1 to #4 to be processed by the time interleavers 6-1 to 6-4 are each configured to include parity bits having a p-clock length in the L-clock length. To spread such parity bits susceptible to an error in the inner code blocks, the time interleavers 6-1 to 6-4 perform, before performing the foregoing time interleaving illustrated in FIG. 3, the processing illustrated in FIG. 4, that is, delaying of the inner code blocks #1 to #4 by different amounts of delay that are each an integer multiple of p clocks to avoid overlapping, on the time axis, of the parity bits of the inner codes (inner code parities) that have been set in the inner code blocks #1 to #4. The amounts of delay introduced to the inner code blocks #1 to #4 are by way of example. Any amount of delay may be used that will avoid overlapping, on the time axis, of the inner code parities that have been set in the inner code blocks #1 to #4 by introducing the delay.

Figure 5:
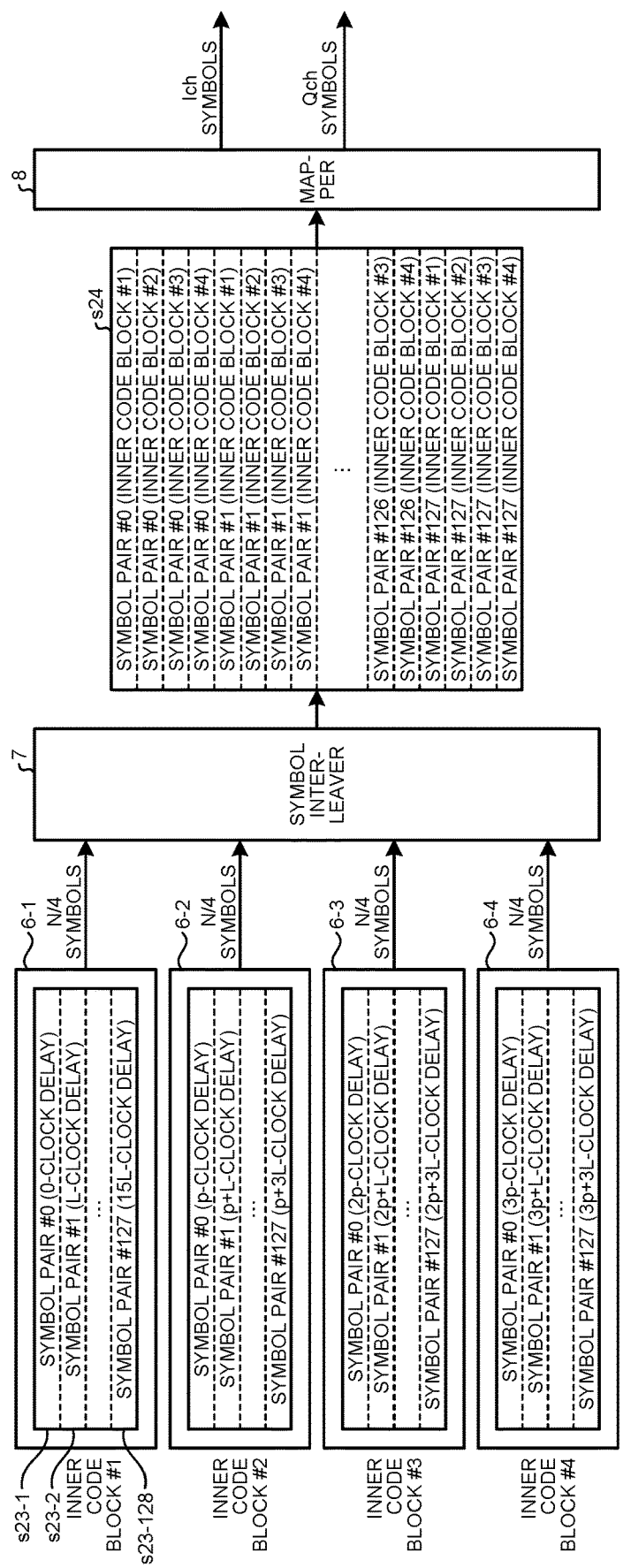
FIG. 5 is a diagram illustrating an example of symbol interleaving performed by a symbol interleaver of the transmission device according to the first embodiment.

Further in the inner code interleaver 5, the symbol interleaver 7 performs symbol interleaving on the inner code blocks #1 to #4 obtained by performing the time interleaving in the time interleavers 6-1 to 6-4. As illustrated in FIG. 5, the symbol interleaver 7 thus sorts the symbol pairs included in the inner code blocks #1 to #4. FIG. 5 is a diagram illustrating an example of symbol interleaving performed by the symbol interleaver 7 of the transmission device 100 according to the first embodiment. The symbol interleaver 7 reorders the symbol pairs on a per-symbol pair basis to cause the symbol pairs positioned at a same position in the respective inner code blocks #1 to #4 to form a subset as illustrated in FIG. 5. That is, the symbol interleaver 7 reorders the symbol pairs to cause the symbol pairs having a same number in the respective inner code blocks #1 to #4 to be positioned adjacent to each other, where the 128 symbol pairs included in each of the inner code blocks #1 to #4 that have been input to the symbol interleaver 7 are numbered as symbol pairs #0 to #127. Note that FIG. 5 illustrates an example in which the time interleavers 6-1 to 6-4 perform processing to introduce the delays illustrated in FIG. 4, and the symbol interleaver 7 then performs symbol interleaving on the inner code blocks #1 to #4 obtained by performing the time interleaving illustrated in FIG. 4.

A signal s24 output by the symbol interleaver 7 illustrated in FIG. 5 is input to the mapper 8. The mapper 8 separates the input signal s24 into I-ch symbols and Q-ch symbols, and performs modulation in order of the symbols.

The modulation operation may be performed using a multi-carrier scheme, in which a symbol is transmitted over multiple carriers. In this case, mapping of symbols by the mapper 8 to map, to different carriers, symbols delayed by a same amount of delay in time interleaving illustrated in FIG. 3 enables a burst error to be further spread in error correction in inner code blocks, and error correction capability to be improved.

As described above, according to the present embodiment, the transmission device 100, which uses concatenated error correction code in multilevel modulation, performs outer coding on the bits of a multilevel modulation symbol sequence, in which interleaving is performed to distribute the symbol sequence over multiple outer code blocks arranged in parallel to each other, and after coding is performed, the resulting sequences are restored to have a multilevel symbol format by deinterleaving, and performs inner coding, in which the coding is performed on all or part of the bits in each of the multiple symbols arranged in parallel to each other, time interleaving is performed on symbol outputs thereof on a per-symbol pair basis, where a symbol pair is a pair of an I-ch symbol and a Q-ch symbol constituting a multilevel modulation symbol, and interleaving is further performed over multiple inner code blocks on a per-symbol pair basis. This can improve capability for correction of both a burst error between symbols and a bit error within a symbol. In particular, performing coding on part of the bits within a symbol in inner coding can also improve resistance to a burst error in the outer code. In addition, the transmission device 100 eliminates the need for use of a memory in interleaving and deinterleaving in outer coding, thereby enabling error correction coding processing to be performed with low latency while reducing or preventing increase in circuit size.

Second Embodiment

The first embodiment has been described with respect to an interleave configuration for increasing burst symbol error resistance of the transmission device 100, which uses concatenated error correction code in multilevel modulation. A reception device on the other side performs an inverse operation of the operation performed by the transmission device 100 to perform error correction processing using concatenated code.

Figure 6:
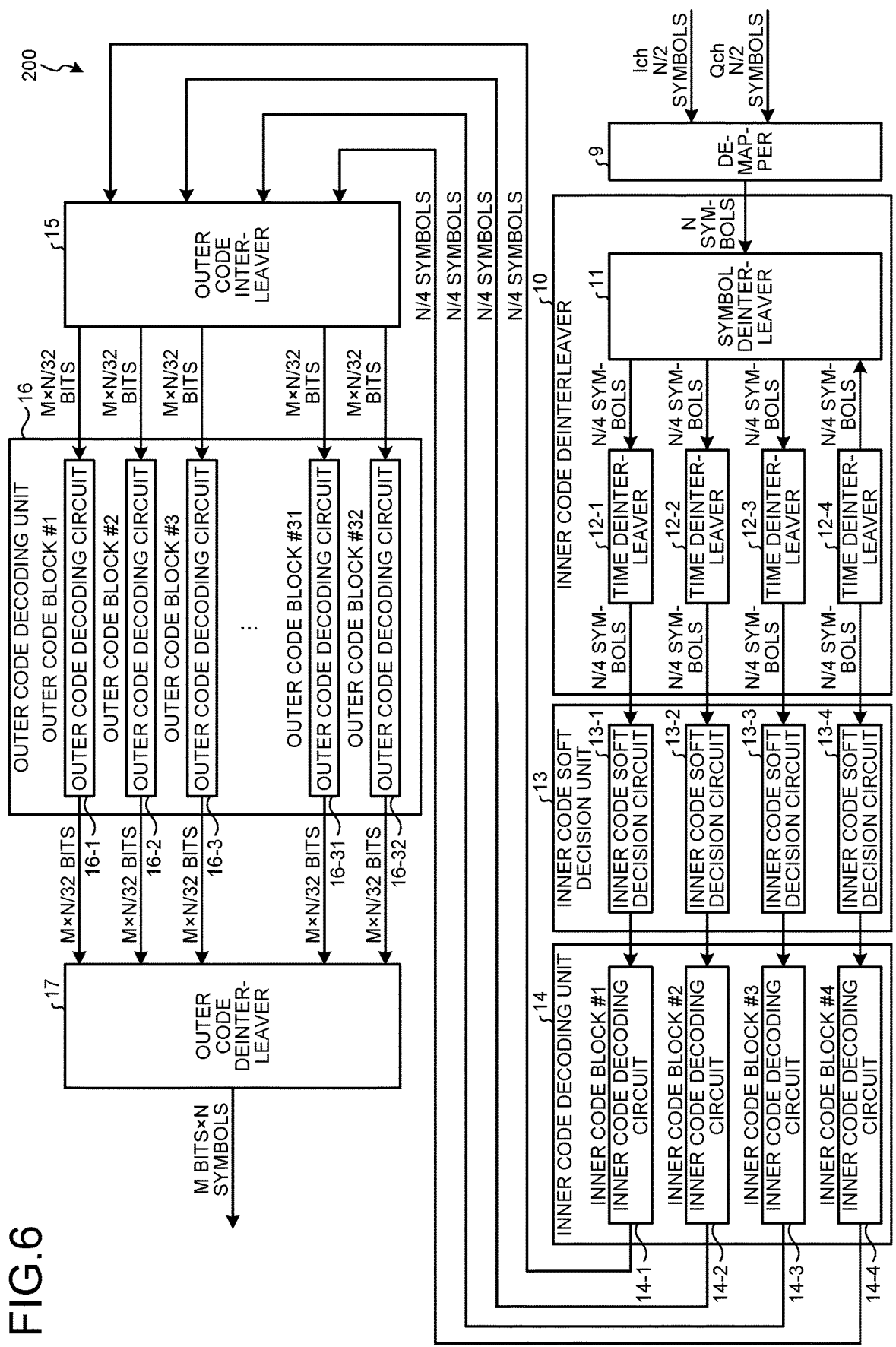
FIG. 6 is a diagram illustrating an example configuration of a reception device according to a second embodiment.

FIG. 6 is a diagram illustrating an example configuration of a reception device 200 according to a second embodiment. The reception device 200 illustrated in FIG. 6 receives a signal transmitted by the transmission device 100 according to the first embodiment, i.e., a signal generated using concatenated error correction code in multilevel modulation.

The reception device 200 includes a demapper 9, an inner code deinterleaver 10 including a symbol deinterleaver 11 and time deinterleavers 12-1 to 12-4, an inner code soft decision unit 13 including inner code soft decision circuits 13-1 to 13-4, an inner code decoding unit 14 including inner code decoding circuits 14-1 to 14-4, an outer code interleaver 15, an outer code decoding unit 16 including outer code decoding circuits 16-1 to 16-32, and an outer code deinterleaver 17.

The demapper 9 demodulates a multilevel modulation symbol of I-ch and Q-ch included in the received signal, and outputs N symbols obtained by demodulation to the inner code deinterleaver 10.

First, in the inner code deinterleaver 10 corresponding to the inner code interleaver 5 of the transmission device 100, the symbol deinterleaver 11 performs deinterleaving on the N symbols input from the demapper 8. Specifically, the symbol deinterleaver 11 performs an inverse operation of the operation performed by the symbol interleaver 7 of the transmission device 100 to restore the order of the N symbols received, to the order before sorting performed by the symbol interleaver 7. The N symbols reordered by the symbol deinterleaver 11 is divided into groups each formed of N/4 symbols, which are then input to the time deinterleavers 12-1 to 12-4 as received symbols. The time deinterleavers 12-1 to 12-4 perform time deinterleaving on the received symbols that have been input. The time deinterleavers 12-1 to 12-4 each adjust the amount of delay on the reception device 200 side to, for example, cause the sum of the amount of delay included in each of the inner code blocks #1 to #4 illustrated in FIG. 5 and the amount of delay included in each symbol sequence output by the symbol deinterleaver 11 of the reception device 200 to be (3p+L)-clock delay, which is the maximum value of the amount of delay on the transmission device 100 side. This operation yields received symbol sequences having amounts of delay the same as the amounts of delay included in the inner code blocks #1 to #4 output by the inner coding circuits 4-1 to 4-4 of the inner code blocks #1 to #4 on the transmission device 100 side. The received symbol sequences including the amounts of delay obtained by the adjustment performed by the time deinterleavers 12-1 to 12-4 are input to the inner code soft decision circuits 13-1 to 13-4 of the inner code soft decision unit 13.

The inner code soft decision circuits 13-1 to 13-4 of the inner code soft decision unit 13 perform a soft decision operation on the received symbol sequences input from the time deinterleavers 12-1 to 12-4.

The inner code soft decision circuits 13-1 to 13-4 may output a hard decision value for a bit, within a symbol, not to be processed in inner code processing, but may rather output, for such bit, multiple candidates that are candidates for the symbol to be estimated based on inner code decoding results, and then cause the inner code decoding circuit 14-4 disposed downstream thereof to select one of the multiple candidates from the inner code decoding results.

In addition, when each symbol includes multiple bits to be processed in inner code processing, the inner code soft decision circuits 13-1 to 13-4 may each generate a soft decision value for each of these bits, extend the results in the time direction as an inner code sequence, and output the result to the inner code decoding unit 14. This indeed requires time adjustment including that in the memory in association with the extension, and requires the inner code decoding unit 14 and downstream components to operate at a clock frequency faster than the symbol transmission clock on the transmission side, but this leads to a decrease in the bit width of the soft decision input to the inner code decoding unit 14, thereby making code sequence decoding processing easier.

The inner code decoding circuits 14-1 to 14-4 of the inner code decoding unit 14 perform decoding in line with the inner coding circuits 4-1 to 4-4 of the transmission device 100. In this operation, the inner code decoding circuits 14-1 to 14-4 each perform decoding based on soft decision on part of each multilevel modulation symbol, in particular, the least significant bit (LSB) having a higher bit error probability than the other bits in the symbol, as the bit to be processed in inner code processing, and each estimate the symbol based on the result thereof. This enables decoding computation processing of inner code using soft decision to be performed only on part of all transmission symbols, and can thus reduce the amount of computation in decoding processing of inner code, corresponding to 1 Tbps-class transmission speed.

Symbol data generated by decoding in the inner code decoding circuits 14-1 to 14-4 are input to the outer code interleaver 15. The outer code interleaver 15 operates in the same manner as the outer code interleaver 1 of the transmission device 100 described in the first embodiment. Note that the outer code interleaver 15 sets, in the parity setting position of the inner code, the fixed value (e.g., 0) used before inner coding. In addition, the inner code decoding circuits 14-1 to 14-4 can also output reliability information or a missing flag simultaneously with the symbol data generated by decoding. In this case, the outer code interleaver 15 performs interleaving on such information in a similar manner to the interleaving performed on the output symbols. The symbol data obtained by reordering through the interleaving performed by the outer code interleaver 15 is input to the outer code decoding unit 16.

The multiple outer code decoding circuits 16-1 to 16-32 disposed in parallel to one another in the outer code decoding unit 16 perform decoding processing on the symbol data that has been input. Note that the outer code decoding circuits 16-1 to 16-32 may extract, upon input of the symbol data, the parity bits that have been set in the outer coding circuits 2-1 to 2-32 of the transmission device 100, replace these values with the fixed value (e.g., 0) used before setting of the parity bit of the outer code, and perform, separately, computation relating to the parity bits extracted. This enables, for example, decoded input computation processing (e.g., syndrome computation processing) to be configured to easily provide parallel processing applicable to 1 Tbps-class transmission.

In addition, to configure the outer code deinterleaver 17 disposed next thereto the same as the outer code deinterleaver 3 of the transmission device 100, the multiple outer code decoding circuits 16-1 to 16-32 output the decoding results all with a same delay irrespective of the amounts of processing of the respective outer code decoding circuits 16-1 to 16-32.

The outer code deinterleaver 17 operates in the same manner as the outer code deinterleaver 3 of the transmission device 100.

As described above, the reception device 200 according to the present embodiment, which uses concatenated error correction code in multilevel modulation, performs deinterleaving processing corresponding to the processing performed in the inner code interleaver 5 of the transmission device 100 according to the first embodiment immediately after demodulation processing performed by the demapper 9, thereafter generates soft decision values for inner code decoding, then performs inner code decoding in parallel to one another, replaces the parity bit of the inner code with the fixed value used before coding, performs interleaving of the outer code, and in decoding of the outer code, extracts the parity bits that have been set in the coding processing in the transmission device 100, replaces these parity bits each with the fixed value used before setting the parity bit, performs decoding of the outer code, and performs deinterleaving in the same manner as the transmission device 100. This enables the reception device 200 to perform burst error correction processing for a multilevel modulation symbol obtained by coding and interleaving in the transmission device 100, in decoding processing applicable to 1 Tbps-class transmission. This also enables error correction decoding processing to be performed with low latency while reducing or preventing increase in circuit size.

Note that the parameters and the encoding rule in the first embodiment and in the second embodiment can obviously be expanded.

Third Embodiment

Figure 7:
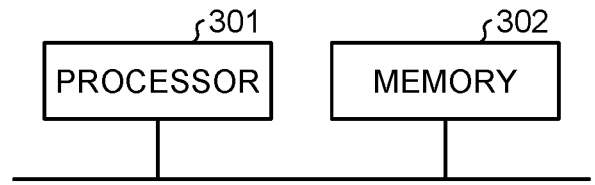
FIG. 7 is a diagram illustrating an example of hardware configuration when the transmission device and the reception device are implemented by programming.

The first embodiment and the second embodiment have been described with respect to the transmission device 100 and the reception device 200, which use concatenated error correction code in multilevel modulation transmission on an assumption of parallel processing to support 1 Tbps-class transmission processing. The processing performed by the transmission device 100 and by the reception device 200 described in the first and second embodiments can be implemented by programming using a processor and a memory when the processing speed is low. For example, the transmission device 100 and the reception device 200 may be implemented by a processor 301 and a memory 302 illustrated in FIG. 7. FIG. 7 is a diagram illustrating an example of hardware configuration when the transmission device 100 and the reception device 200 are implemented by programming.

The processor 301 is, for example, a central processing unit (CPU), a processing unit, a computing unit, a microprocessor, a microcomputer, a digital signal processor (DSP), or the like. In addition, the memory 302 is, for example, a non-volatile or volatile semiconductor memory such as a random access memory (RAM), a read-only memory (ROM), a flash memory, an erasable programmable ROM (EPROM), or an electrically erasable programmable ROM (EEPROM) (registered trademark); a magnetic disk, a flexible disk, an optical disk, a compact disc, a MiniDisc, a digital versatile disc (DVD), or the like.

For example, when the transmission device 100 described in the first embodiment is implemented by the processor 301 and the memory 302 illustrated in FIG. 7, the transmission device 100 is implemented in such a manner that a program for causing the processor 301 to operate as the transmission device 100 is stored in advance in the memory 302, and the processor 301 reads and executes this program. When the reception device 200 described in the second embodiment is implemented by the processor 301 and the memory 302 illustrated in FIG. 7, the memory 302 stores a program for causing the processor 301 to operate as the reception device 200.

Note that the program to be stored in the memory 302 may be written in a storage medium such as, for example, a compact disc (CD)-ROM or a digital versatile disc (DVD)-ROM, and be provided to a user and/or the like in that form.

Processes performed by the processor 301 when the transmission device 100 and the reception device 200 are implemented by the processor 301 and by the memory 302 will next be described with reference to FIGS. 8 and 9.

Figure 8:
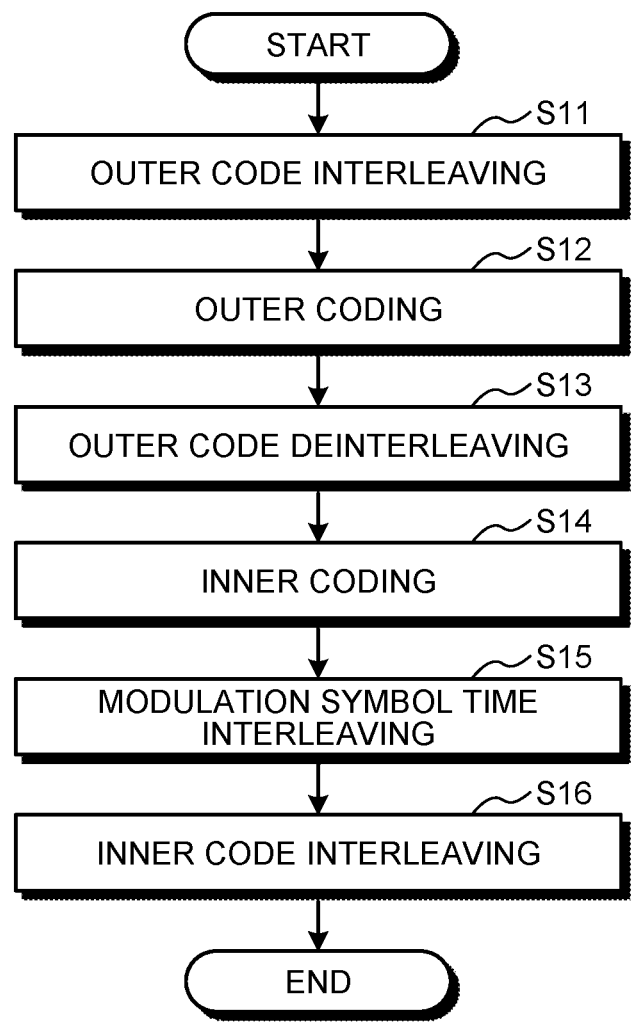
FIG. 8 is a flowchart illustrating an example of process performed by the processor implementing the transmission device.

FIG. 8 is a flowchart illustrating an example of process performed by the processor 301 implementing the transmission device 100.

It is assumed that an arrangement of multilevel modulation symbols obtained by processing such as PS operation is stored in the memory 302 at the time of start of the sequence of processing illustrated in FIG. 8. Note that it is also assumed that a fixed value (e.g., 0) is recorded in the symbol bits where the parity bits of the outer code and the inner code are to be set.

The processor 301 first performs outer code interleaving (step S11). This process corresponds to the interleaving performed by the outer code interleaver 1 of the transmission device 100. The interleaving is performed in such a manner that each bit of the outer code is sequentially copied in an outer code arrangement prepared for each of multiple outer codes according to an interleaving rule from the arrangement prepared at the time of start. Note that copying can be performed by control by a program, or by control by looking up a table, according to a rule for the N symbols illustrated in FIG. 1, and repeating L times for the parallel number of outer coding.

The processor 301 next performs outer coding processing (step S12). This process corresponds to the coding processing performed by the outer coding unit 2 of the transmission device 100. In the outer coding processing, the processor 301 performs as many coding processings as the parallel number. The parity bit of the outer code obtained by this processing is overwritten in a predetermined outer code parity position (position of parity bit) of the outer code arrangement generated by the outer code interleaving at step S11, or is recorded in an arrangement for the outer code parity that has been prepared.

The processor 301 next performs outer code deinterleaving (step S13). This process corresponds to the deinterleaving performed by the outer code deinterleaver 3 of the transmission device 100. In the outer code deinterleaving, the processor 301 performs, on the outer code arrangement, deinterleaving processing including processing of the outer code parities (parity bits of the outer code) by performing inverse operation of the interleaving at step S11 to thus restore the multilevel modulation symbol arrangement. In this respect, the amount of computation will be reduced by using the arrangement for the outer code parity to perform deinterleaving processing only on the outer code parities, and to replace a value in the predetermined outer code parity position in the multilevel modulation symbol arrangement as of the time of start. Note that, from a viewpoint of distributing the outer code over symbol arrangements, a method is also conceivable in which the outer code parities are not written into the multilevel modulation symbol arrangement used for outer coding, but are tentatively recorded in another arrangement, and then written into a multilevel modulation symbol arrangement for use in the next outer coding process.

The processor 301 next performs inner coding processing (step S14). This process corresponds to the coding processing performed by the inner coding unit 4 of the transmission device 100. The processor 301 performs coding processing on the multiple inner code sequences. The inner coding is performed such that multilevel modulation symbols each formed of a pair of an I-ch symbol and a Q-ch symbol will be included in a same inner code sequence. In addition, an entirety of each multilevel modulation symbol may be coded, but considering a high amount of computation in such operation, inner coding may be performed only on the LSB of a symbol having a high error occurrence probability. In this case, the parity generated in the inner code processing may be positioned in the MSB of a predetermined symbol. Alternatively, this parity may be positioned in the LSB of a symbol in the next inner code sequence. Positioning the parity in the LSB of a symbol in the next inner code sequence enables symbol errors to be spread across symbols.

The processor 301 next performs modulation symbol time interleaving (step S15), and then performs inner code interleaving (step S16). These processes correspond to the time interleaving performed by the time interleavers 6-1 to 6-4 and the symbol interleaving performed by the symbol interleaver 7, of the transmission device 100. These two processes may be performed in reverse order. However, considering that the time interleaving at step S15 is performed on multiple parallelized inner code sequences, the processing is simpler when the processor 301 performs the time interleaving at step S15 on the arrangement obtained by the inner coding processing at step S14, and then performs the symbol interleaving. Note that the time interleaving requires an arrangement corresponding to a predetermined time delay. According to the time interleaving rule of the time interleavers 6-1 to 6-4 illustrated in FIG. 5, data delayed by a predetermined amount of delay of each symbol is recorded in the arrangement having a size corresponding to L clocks of the outer code block because the beginning of the frame of the outer code is output with zero delay. Upon completion of inner code interleaving of that arrangement, multilevel modulation symbol data generated by concatenated coding and by multilevel modulation interleaving, transmittable to the mapper 8, is stored, in the arrangement, in an amount corresponding to the outer code block frame.

Figure 9:
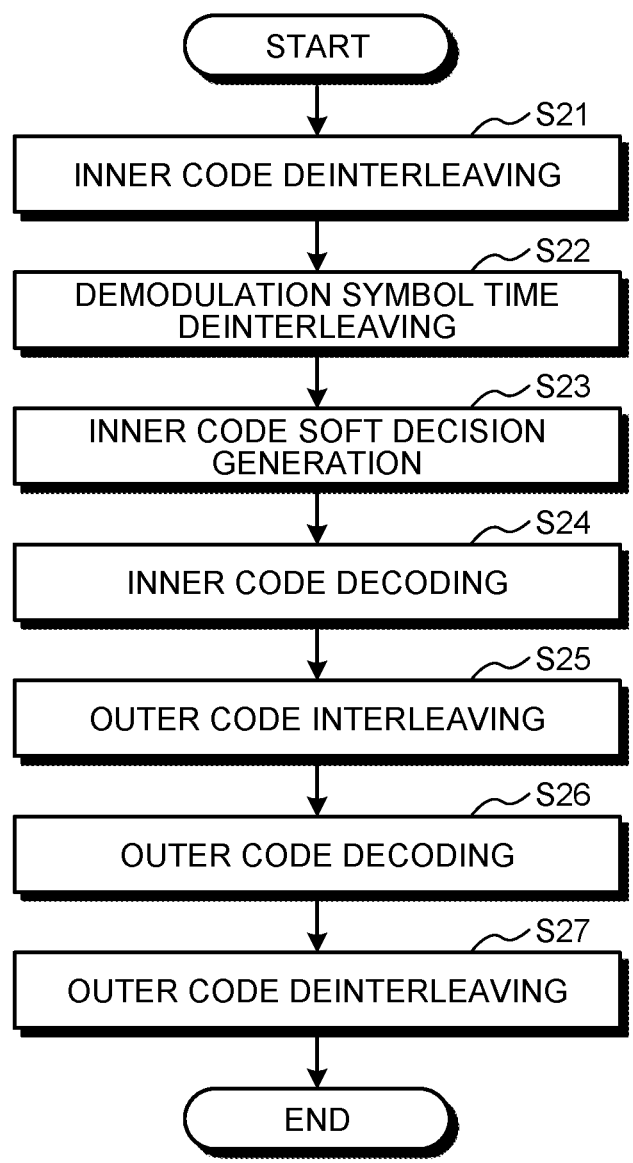
FIG. 9 is a flowchart illustrating an example of process performed by the processor implementing the reception device.

FIG. 9 is a flowchart illustrating an example of process performed by the processor 301 implementing the reception device 200.

It is assumed that, at the time of start of the sequence of processing illustrated in FIG. 9, symbol data of I-ch and Q-ch is stored, in the arrangement, in an amount corresponding to the outer code blocks to be processed in parallel in line with the transmission device 100 on the transmission side.

The processor 301 first performs inner code deinterleaving on symbol data of I-ch and Q-ch to divide the symbol data into inner code blocks (step S21). This process corresponds to the deinterleaving performed by the symbol deinterleaver 11 included in the inner code deinterleaver 10 of the reception device 200

The processor 301 next performs demodulation symbol time deinterleaving on the inner code blocks (step S22). This process corresponds to the time deinterleaving performed by the time deinterleavers 12-1 to 12-4 included in the inner code deinterleaver 10 of the reception device 200. The processing of the demodulation symbol time deinterleaving is basically the same as the time deinterleaving performed by the time deinterleavers 12-1 to 12-4, but the processor 301 further provides an amount of delay corresponding to L clocks, and outputs the resulting data to the arrangement on a per-outer code block basis because a largest amount of delay arises at the beginning of the outer code block obtained by deinterleaving.

The processor 301 next performs inner code soft decision generation processing (step S23). This process corresponds to the soft decision operation performed by the inner code soft decision unit 13 of the reception device 200.

The processor 301 next performs inner code decoding processing (step S24). This process corresponds to the decoding processing performed by the inner code decoding unit 14 of the reception device 200. In the inner code decoding processing, the processor 301 performs same decoding processing on a predetermined parallel number of inner code blocks, and records symbols updated to reflect the result of decoding, in the arrangement.

The processor 301 next performs outer code interleaving on the symbols obtained by the inner code decoding (step S25). This process corresponds to the interleaving performed by the outer code interleaver 15 of the reception device 200. In the outer code interleaving, the processor 301 positions the symbols obtained by the inner code decoding in an arrangement of a predetermined number of outer code sequences. In this operation, when the parity of the outer code is set in part of the symbol bits, the outer code parities are set in positions after the information bit sequences in the arrangement of the outer code sequences, and sets the fixed value (e.g., 0) used before coding, in the symbol bits where the parities have been set.

The processor 301 next performs outer code decoding processing on a predetermined number of outer code blocks (step S26). This process corresponds to the decoding processing performed by the outer code decoding unit 16 of the reception device 200.

The processor 301 next performs outer code deinterleaving on the outer code sequences obtained by the decoding in the outer code decoding processing (step S27). This process corresponds to the deinterleaving performed by the outer code deinterleaver 17 of the reception device 200. In the outer code deinterleaving, the processor 301 restores the outer code sequences obtained by decoding, to have the format of multilevel modulation symbol before coding, and outputs the multilevel modulation symbol. Note that after the outer code decoding processing is performed at step S26, the outer code parities are not used. Accordingly, the outer code parities that were set at step S25 in positions after the information bit sequences may be excluded from the bits to be processed with the outer code deinterleaving at step S27.

As described above, when the processing speed is low, programming using a processor and a memory can also implement processing for error correction to be performed by the transmission device 100 and by the reception device 200, which use concatenated error correction code for multilevel modulation symbols.

A transmission device according to the present disclosure provides an advantage in capability of performing error correction coding processing with low latency while reducing or preventing increase in circuit size.

The configurations described in the foregoing embodiments are merely examples. These configurations may be combined with a known other technology, and configurations of different embodiments may be combined together. Moreover, part of such configurations may be omitted and/or modified without departing from the spirit thereof.

What is claimed is:

1. A transmission device comprising:
a processor to execute a program; and
a memory to store the program that, when executed by the processor, performs:
an outer code interleaver process of generating a plurality of bit sequences while performing interleaving on a signal on a per-bit basis, the signal being formed of a plurality of multilevel modulation symbols;
an outer coding process of performing outer coding processings, in parallel, on the plurality of respective ones of the bit sequences generated by the interleaving;
an outer code deinterleaver process of performing deinterleaving on bit sequences obtained by the outer coding processings, the deinterleaving being inverse operation of the interleaving performed by the outer code interleaver process;
an inner coding process of performing inner coding processings, in parallel, on bit sequences obtained by the deinterleaving in the outer code deinterleaver process; and
an inner code interleaver process of performing time interleaving and symbol interleaving on bit sequences obtained by the inner coding processings.

2. The transmission device according to claim 1, wherein
the outer coding process is performed by a plurality of outer coding circuits, and
the outer code interleaver process including assigning respective ones of the bits included in each of the multilevel modulation symbols to different ones of the outer coding circuits.

3. The transmission device according to claim 1, wherein
the inner coding process is performed by a plurality of inner coding circuits, and
the outer code deinterleaver process includes: providing bit sequences in pre-interleaving order by performing the deinterleaving; dividing the bit sequences in the pre-interleaving order into bit sequences equal in number to the plurality of inner coding circuits; and inputting the bit sequences obtained by the division to the plurality of inner coding circuits.

4. The transmission device according to claim 3, wherein
the number of the inner coding circuits is a divisor of the number of the outer coding processings performed in parallel by the outer coding process.

5. The transmission device according to claim 3, wherein
the inner code interleaver process includes
time interleaver processes of performing the time interleaving, the time interleaver processes being equal in number to the inner coding circuits, and
a symbol interleaver process of performing the symbol interleaving, wherein
the time interleaver processes each delay, by an amount of delay, each of symbol pairs included in a post-inner-coding symbol sequence output by a corresponding one of the inner coding circuits, the symbol sequence including modulation units defined by each of the symbol pairs, the amount of delay being based on a size of the symbol sequence and differing between adjacent ones of the symbol pairs, and
the symbol interleaver process includes reordering symbol sequences delayed by the respective time interleavers, to cause symbol pairs positioned at the same positions in the respective symbol sequences to be placed adjacent to each other.

6. The transmission device according to claim 3, wherein
the inner code interleaver process includes
time interleaver processes of performing the time interleaving, the time interleaving processes being equal in number to the inner coding circuits, and
a symbol interleaver process of performing the symbol interleaving, wherein
each of the time interleaver processes delays a processing-target symbol sequence to cause a parity setting position of the symbol sequence to differ from a parity setting position of a symbol sequence to be processed by another one of the time interleaver processes, the processing-target symbol sequence being a post-inner-coding symbol sequence output by a corresponding one of the inner coding circuits, and each of the time interleavers further delays, by an amount of delay, each of symbol pairs included in the processing-target symbol sequence, the symbol pairs each defining modulation units, the amount of delay being based on a size of the symbol sequence and differing between adjacent ones of the symbol pairs, and
the symbol interleaver process includes reordering symbol sequences delayed by the respective time interleavers, to cause symbol pairs positioned at the same positions in the respective symbol sequences to be placed adjacent to each other.

7. The transmission device according to claim 1, wherein
the outer coding process performs coding using BCH code as the outer coding processings, and
the inner coding process performs coding using LDPC code as the inner coding processings.

8. A reception device, wherein
the reception device comprising:
a processor to execute a program; and
a memory to store the program that, when executed by the processor, performs a process of receiving a signal transmitted from the transmission device according to claim 1, and decoding a received signal by performing decoding processings corresponding to the inner coding processings and the outer coding processings.

9. The reception device according to claim 8, wherein
in time deinterleaving corresponding to the time interleaving performed by the inner code interleaver process of the transmission device, the program of the reception device performs a process of delaying each of a plurality of received symbol sequences to cause the received symbol sequences to be delayed by the same amount, the received symbol sequences being to be decoded in parallelized decoding processings corresponding to the inner coding processings.

10. An encoding method for a transmission device to perform error correction coding on a signal formed of a plurality of multilevel modulation symbols, the encoding method comprising:
generating a plurality of bit sequences while performing interleaving on the signal on a per-bit basis;
performing outer coding processings, in parallel, on the plurality of respective ones of the bit sequences generated by the interleaving;
performing deinterleaving on the bit sequences obtained by the outer coding processings, the deinterleaving being inverse operation of the interleaving;
performing inner coding processings, in parallel, on the bit sequences obtained by the deinterleaving; and
performing time interleaving and symbol interleaving on the bit sequences obtained by the inner coding processings.

11. A control circuit to control a transmission device to perform error correction coding on a signal formed of a plurality of multilevel modulation symbols, the control circuit causing the transmission device to perform:
 generating a plurality of bit sequences while performing interleaving on the signal on a per-bit basis;
 performing outer coding processings, in parallel, on the plurality of respective ones of the bit sequences generated by the interleaving;
 performing deinterleaving on the bit sequences obtained by the outer coding processings, the deinterleaving being inverse operation of the interleaving;
 performing inner coding processings, in parallel, on the bit sequences obtained by the deinterleaving; and
 performing time interleaving and symbol interleaving on the bit sequences obtained by the inner coding processings.

* * * * *